(12) United States Patent
Plochowietz et al.

(10) Patent No.: US 11,738,503 B2
(45) Date of Patent: Aug. 29, 2023

(54) CONSTRUCTING 3-DIMENSIONAL PARTS USING ELECTROPHOTOGRAPHY

(71) Applicants: Palo Alto Research Center Incorporated, Palo Alto, CA (US); Xerox Corporation, Norwalk, CT (US)

(72) Inventors: Anne Plochowietz, Palo Alto, CA (US); Ashish V. Pattekar, Cupertino, CA (US); Jengping Lu, Fremont, CA (US); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/532,817

(22) Filed: Nov. 22, 2021

(65) Prior Publication Data
US 2022/0097295 A1 Mar. 31, 2022

Related U.S. Application Data

(62) Division of application No. 16/236,172, filed on Dec. 28, 2018.

(51) Int. Cl.
| | | |
|---|---|---|
| *B29C 64/147* | (2017.01) | |
| *B29C 64/321* | (2017.01) | |
| *B29C 64/205* | (2017.01) | |
| *G03G 15/22* | (2006.01) | |

(52) U.S. Cl.
CPC .......... *B29C 64/147* (2017.08); *B29C 64/205* (2017.08); *B29C 64/321* (2017.08); *G03G 15/224* (2013.01)

(58) Field of Classification Search
CPC ... B29C 64/147; B29C 64/205; B29C 64/321; G03G 15/224
See application file for complete search history.

(56) References Cited

U.S. PATENT DOCUMENTS 5,593,531 A * 1/1997 Penn ................ G03G 15/04045
425/174.8 E
6,585,847 B1 * 7/2003 Natter ................... B29C 64/147
430/281.1

FOREIGN PATENT DOCUMENTS

| JP | 2000177016 A | * | 6/2000 | ........... B29C 64/141 |
| WO | 2016084350 A1 | | 6/2016 | |

OTHER PUBLICATIONS

Extended European Search Report dated May 14, 2020 for European Patent Application No. 19219894.3.

* cited by examiner

*Primary Examiner* — Daniel McNally
(74) *Attorney, Agent, or Firm* — Womble Bond Dickinson (US) LLP

(57) ABSTRACT

Systems and methods for constructing 3-dimensional (3D) parts are disclosed. A printing system may include a deposition system configured to print a plurality of 2-dimensional (2D) layers onto a plurality of carrier sheets. The printing system also includes a transferring system configured to transfer a 2D layer from a carrier sheet of the plurality of carrier sheets, onto the 3D part. The 3D part may be located on a base substrate. The printing system further includes a feed system configured to provide the plurality of carrier sheets from the deposition system to the transfer system in a successive fashion while maintaining the directionality of printing in the deposition and transferring systems.

17 Claims, 7 Drawing Sheets

CONSTRUCTING 3-DIMENSIONAL PARTS USING ELECTROPHOTOGRAPHY

CROSS-REFERENCE TO RELATED APPLICATIONS

This application is a divisional of U.S. patent application Ser. No. 16/236,172, filed Dec. 28, 2018, the contents of which are hereby incorporated by reference in its entirety.

TECHNICAL FIELD

This application relates to three-dimensional (3D) printing or Additive Manufacturing (AM) systems.

BACKGROUND

Three dimensional printing (3DP)/Additive Manufacturing (AM) technologies may typically rely on a layer-by-layer additive approach, in which a part (e.g., a workpiece) with the desired three dimensional (3D) geometry is created by repeatedly developing 2D patterns (e.g., in the form of individual layers typically less than ~100-200 micrometers thick) that are successively added on top of each-other.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the examples, implementations, and embodiments described here.

DETAILED DESCRIPTION

Figure 1A:
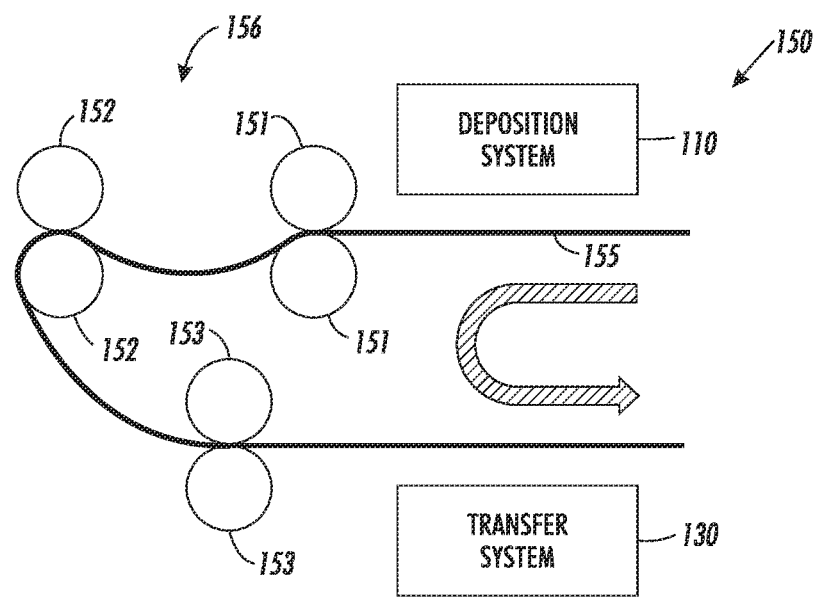
FIG. 1A is a diagram illustrating an example 3D printing system, in accordance with one or more embodiments of the present disclosure.

As discussed above, 3DP or AM technologies may rely on a layer-by-layer additive approach, in which a part (e.g., a workpiece) with the desired 3D geometry is created by repeatedly developing 2D patterns that are successively (sequentially) added on top of each-other. Such a process may lead to increases in process (fabrication) time due to the repeated, discontinuous, 'stop-and-go' nature of the layer-by-layer additive manufacturing approach. Moreover, the back-and-forth motion associated with the 2D layer development subsystems (and the required acceleration and deceleration within the short travel path for each layering step) limits the maximum linear speed with which each layer can be deposited. This stop-and-go nature of layered 3DP/AM technologies and the mechanical limits on maximum deposition speeds due to the associated back-and-forth motion during layer deposition result in loss of productivity in terms of the overall manufacturing speed/part fabrication throughput that can be achieved by state-of-the-art 3DP/AM technologies. Thus, it would be useful to be able to fabricate parts more quickly by developing 3DP or AM systems or technologies that do not rely on the discontinuous, sequential stop-and-go processing approaches commonly utilized by existing 3DP/AM technologies State of the art 3D printing techniques such as Selective Laser Sintering (SLS), Stereolithography (SLA), Solid-Ground Curing (SGC), Multi-Jet Fusion (MJF), and Laminated Object Manufacturing (LOM) rely on a layer-by-layer 'additive' approach, wherein a part with the desired 3-dimensional geometry is created by repeatedly developing 2-dimensional patterns (in the form of individual layers typically less than ~100-200 micrometers thick) that are successively added on top of each-other thereby 'building up' the desired part. Other 3DP/AM techniques such as Fused Deposition Modeling (FDM), extrusion printing, and Laser Engineered Net Shaping (LENS) rely on creating a 1-dimensional (line) pattern that is written into a 2D (X-Y) layer and the desired 3D geometry is realized by continually "building up" the X—Y layers in the vertical (Z) direction. A sacrificial support material (hereinafter "support material" or "supporting material") may be added for each layer where the material to be 3D printed to form the 3D parts (hereinafter "active material" or "active 3D printing material") was not deposited (to fill in the open areas or voids in the 2D pattern), before starting the subsequent Z direction layer so that overhangs in successive layers may be reliably deposited and supported on top of the underlying layers.

In many instances of utilizing these techniques, there is a significant down-time between developing the successive layers. For example, in SLS/MJF or other Powder Bed Fusion (PBF) techniques, layering of the powder first and then patterning with (1) a laser beam (usually modulated/pattern-wise scanned using a galvo system) or (2) a binder (typically deposited using an inkjet-like print-head) in a sequential back-and-forth motion of the powder layering and development system means that the laser or binder jetting print-head (e.g., piezoelectric mechanism based print-head, thermal mechanism based print-head) is not developing patterns continuously. The above 3DP/AM systems may thus suffer from an approximately 50% down-time during which the development mechanism (laser/binder jet or other underlying patterning process) is waiting for the next layer to "get ready", in order to be patterned.

Moreover, the 2D layered approach typically relies on back-and-forth motion of multiple sub-systems/components of the development system (e.g., a powder spreader/compaction roller or binder jetting print-head assembly, etc.)—and the resulting start-accelerate-decelerate-stop-and-reverse sequence places fundamental mechanical limits on how fast the linear speed of the process can be during the patterning step, requires complex mechanical components that reduce system reliability, and adds significantly to the cost as much larger actuators and power supplies are required to generate these large accelerations needed to reduce fabrication times. The added weight and cost is particularly evident in multi-axis motions where the heavier actuators themselves must be rapidly accelerated or decelerated.

For the purpose of depositing 2D layers onto the 3D part, the 2D layer and 3D printed part should be aligned with each other. To do this generally, either the printed 3D part or the 2D layer may undergo a stop-and-go motion (e.g., may accelerate-and-decelerate) for alignment purposes. For example, either the 3D part or the 2D layer (that is being deposited onto the 3D part) may move from left to right and back to the left repeatedly (as discussed in more detail below). From a mechanical engineering, and cost-effectiveness point-of-view, it would be advantageous to decrease the weight and load of the accelerated-and-decelerated component within the printing system to increase print speed. Light weight or low-mass sheets (carrier sheets) that hold the printed 2D layer and release the printed 2D layer onto the 3D printed part may be fed along process direction or printing direction from the deposition system to the transfer system. This overcomes the back-and-forth motion of the 3D printed part, or powder layering development system as previously described.

FIG. 1A is a diagram illustrating an example 3D printing system 150, in accordance with one or more embodiments of the present disclosure. The 3D printing system 150 includes a carrier belt 155, deposition system 110, rollers 151, rollers 152, rollers 153, and a transfer system 130. The rollers 151, rollers 152, rollers 153 may control the speed and direction of the movement of the carrier belt 155. For example, the rollers 151, 152, and 153 may move the carrier belt 155 in a counter-clockwise direction as illustrated by the hashed arrow in FIG. 1A. The rollers 151, rollers 152, and rollers 153 may rotate or turn in the direction illustrated by the arrows within the rollers 151, rollers 152, rollers 153. The deposition system 110 may deposit 2D layers onto the surface of the carrier belt 155. For example, during a deposition phase, the deposition system 110 may deposit active material (e.g., material that may be included in a 3D part) and support material (e.g., a sacrificial material) onto the carrier belt 155. The transfer system 130 may transfer a 2D layer from the carrier belt 155 to a 3D part to build, manufacture, construct, etc., the 3D part. For example, during a transfer phase, the transfer system 130 may include a heated surface (e.g., a heated plate) that may be used to press or laminate a 2D layer onto the 3D part. The transfer depositions system 110 and the transfer system 130 are discussed in more detail below.

The rollers 151 and 152 may be part of a service loop 156. The service loop 156 may control the speed of the carrier belt 155 to allow for different portions of the carrier belt 155 to travel at different speeds. For example, the service loop 156 may change the speed of a first portion of the carrier belt 155 such that the first portion of the carrier belt travels at a faster speed near or at the deposition system 110. The service loop 15 may also change the speed of a second portion of the carrier belt 155 such that the second portion of the carrier belt travels at a slower speed near or at the transfer system 130. The rollers 152 (e.g., the pair or set of rollers 152) and the rollers 151 (e.g., the pair or set of rollers 151) may be moved closer to each other or farther way from each other to change the speed of different portions of the carrier belt 155.

The changes in speed may result in an inconsistent or unnatural motion which results in the rocking of the 2D layer that is being transferred onto the 3D part. This rocking motion might increase the time it takes to build the 3D part because the speed of the carrier belt 155 may be slowed down at different portions.

Figure 1B:
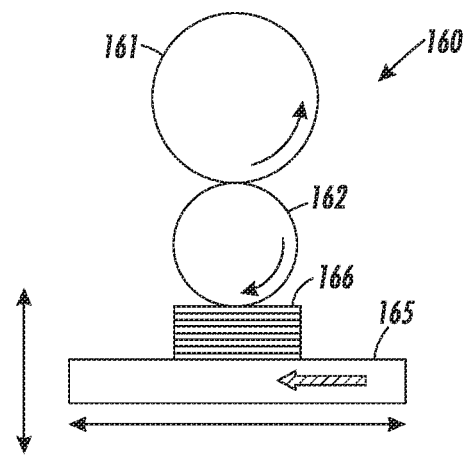
FIG. 1B is a diagram illustrating an example 3D printing system, in accordance with one or more embodiments of the present disclosure.

FIG. 1B is a diagram illustrating an example 3D printing system 160, in accordance with one or more embodiments of the present disclosure. The 3D printing system 160 includes a deposition drum 161, a transfer drum 162, and a platen 165. The deposition drum 161 may deposit 2D layers onto the transfer drum 162. The 2D layers may include one or more of active materials and support materials. The transfer drum 162 may transfer a 2D layer from the transfer drum 162 to a 3D part 166 to build, manufacture, construct, etc., the 3D part 166.

The platen 165 is a movable platen that may be movable to the left, right, up and down, as illustrated by the arrows in FIG. 1B. The platen 165 may be moved to allow the transfer drum 162 to transfer 2D layers onto the 3D part 166 to build up the 3D part 166. For example, the platen 165 may be moved from the left to right to allow the transfer drum 162 to transfer a 2D layer onto the 3D part 166. The platen 165 is then moved back to the left (e.g., the position of the platen 165 is reset) to allow another 2D layer to be transferred onto the 3D part 166.

This left to right motion (e.g., back and forth motion) may increase the amount of time for building the 3D part 166. For example, as the platen 165 moves back to the left (as illustrated by the hashed arrow in the platen 165), the transfer drum 162 rotates clockwise and the deposition drum 161 rotates counter-clockwise. As the platen 165 moves towards the right, the transfer drum 162 rotates counter-clockwise and the deposition drum 161 rotates clockwise. In addition, more equipment and energy is used to move the platen 165. For example, the platen 165 may be a metal block or plate that make be heavy to move left, right, up, down, etc. It make take energy (e.g., power) and time to accelerate the platen 165 towards the right, decelerate the platen 165 once the platen reaches the right side, accelerate the platen 165 back towards the left, and decelerate the platen 165 once the platen reaches the left side again. In addition, the back and forth motion (e.g., rocking motion) may reduce precision when building the 3D part 166. For example, the back and forth motion may cause some of the 2D layers to improperly align with the 3D part 166.

Figure 1C:
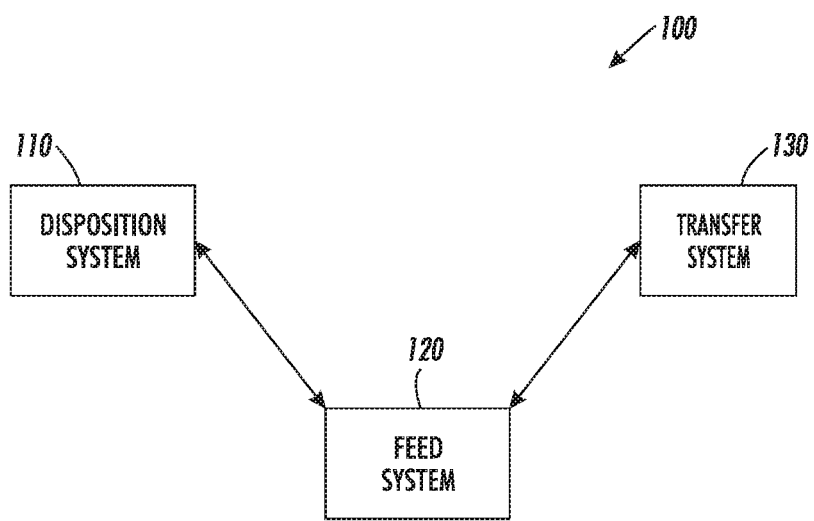
FIG. 1C is a diagram illustrating an example 3D printing system, in accordance with one or more embodiments of the present disclosure.

FIG. 1C is a diagram illustrating an example 3D printing system 100, in accordance with one or more embodiments of the present disclosure. The 3D printing system 100 includes a deposition system 110, a feed system 120, and a transfer system 130. The deposition system 110 may deposit, print, etc., 2-dimensional (2D) layers of materials onto one or more carrier sheets (e.g., silicon sheets), as discussed in more detail below. The feed system 120 may provide one or more carrier sheets (that have 2D layers) to the transfer system 130 (e.g., via a conveyor belt, tray, loops, rollers, etc.), as discussed in more detail below. The transfer system 130 may transfer the 2D layers of one or more carrier sheets onto a 3D part that may be located on a base substrate, as discussed in more detail below.

In different embodiments, the carrier sheets may be composed of different materials. In one embodiment, the carrier sheets may be composed of a low-surface energy material. For example, the carrier sheets may be silicon sheets (e.g., may have silicone material), Teflon sheets (e.g., may have Teflon material), fluoropolymer sheets (e.g., may have Polyethylene terephthalate (PET), Polyetheretherketone (PEEK), Polytetrafluoroethylene (PTFE), Fluorinatedethylenepropylene (FEP), Perfluoroalkoxy alkane, Polyvinylidene fluoride (PVDF), Ethylene Tetrafluoroethylene (ETFE) etc. material) etc. In another embodiment, the carrier sheets may be composed of a heat-release material. For example, the carrier sheets may be thermosetting polymer sheets, thermoplastic polymer sheets, etc. In a further embodiment, the carrier sheets may be composed of a dissolvable material.

As discussed above, the deposition system 110 is configured to deposit 2D layers onto the surface (e.g., upper surface, top surface, etc.) of one or more carrier sheets. In one embodiment, the deposition system 110 may continuously deposit or print the 2D layer onto the surface of one or more carrier sheets. For example, during the deposition phase, the deposition system 110 may continuously deposit or print 2D layers onto the surface of a plurality of carrier sheets (e.g., print, deposit, etc., a patterned 2D layer onto each carrier sheet).

In one embodiment, the deposition system 110 may include an electromagnetic radiation (EMR) emission device. The EMR emission device may generate waves that may carry electromagnetic radiant energy. For example, the EMR emission device may generate one or more of microwaves, infrared light, (visible) light, ultraviolet light, X-rays, gamma rays, etc. The deposition system 110 may use the EMR emission device to apply particles (e.g., toner particles) to the plurality of carrier sheets. For example, deposition system 110 may include an imaging drum (e.g., a rotating cylinder) that may have an electrically charged surface (e.g., a negatively charged surface). The EMR emission device may include a laser that may remove the charge from portions of the surface of the imaging drum. The toner particles may be electrostatically attracted or attached to the portions of the surface of the imaging drum that have no charge. The imaging drum may rotate as a carrier sheet is fed, rolled, etc., past the imaging drum such that the carrier sheet is in contact with the imaging drum. This may move the toner particles onto the surface (e.g., the top surface) of the carrier sheet. The deposition system 110 may fuse the toner particles to each other and/or onto the surface of the carrier sheet using heat, a chemical process, etc., to form the 2D layer. Thus, the deposition system 110 may perform functions, actions, operations, etc., that may be similar to those of a laser printer. In one embodiment, the deposition or printing of the 2D layer onto the carrier sheets may be referred to as electrophotography, xerography, etc.

In different embodiments, the toner particles may include different types of materials. For example the toner particles may include polymer particles. In another example, the toner particles may include metallic particles. In a further example, the toner particles may include ceramic particles.

In one embodiment, the deposition system 110 may include one or more jets (e.g., sprayers, nozzle, etc.) that may deposit ink or slurry onto the plurality of carrier sheets. For example, the deposition system 110 may include one or more jets positioned above a carrier sheet. The one or more jets may be movable such that the jets may be able to deposit ink or slurry onto different areas or portions of a carrier sheet. For example, the one or more jets may be movable along an X-axis and/or a Y-axis to deposit ink or slurry onto different areas or portions of the carrier sheet. A jet may also be referred to as a jetting print head, an inkjet, an inkjet head, a print head, etc. The ink or slurry may include different types of materials, particles, etc., in different embodiments. For example, the ink or slurry may be a polymer ink that may include polymer particles. In another example, the ink may be a metallic ink that includes metallic particles. In a further embodiment, the ink or slurry may include ceramic particles. In some embodiments, the ink may be cured, solidified, dried, etc., after the ink is deposited (e.g., printed) onto the carrier sheet to form a 2D layer on the carrier sheet. For example, a UV light may be used to cure (e.g., via photopolymerization) the ink to form the 2D layer. In another example, heat may be applied to the carrier sheet (e.g., via an infrared lamp or heat lamp) to dry the ink to form the 2D layer.

In one embodiment, the deposition system 110 may deposit, print, etc., the 2D layer onto the carrier sheet at a particular location and/or orientation. The deposition system 110 may align the 2D layer such that the 2D layer (pattern) is located at a particular location and/or orientation on the carrier sheet. For example, the deposition system 110 may use a set of alignment features which may be on or part of the carrier sheets. The alignment features may be shapes that may be used to determine where the 2D layer should be deposited onto the carrier sheet, as discussed in more detail below. In another example, the deposition system may use one or more edges or corners of the carrier sheet to determine where the 2D layer should be deposited onto the carrier sheet, as discussed in more detail below. Aligning the 2D layers on their respective carrier sheets may also help to align different 2D layers of different carrier sheets with each other, as discussed in more detail below. Aligning the different 2D layers with each other may allow the different 2D layers to be properly aligned to construct the 3D part.

In one embodiment, the feed system 120 may transfer the plurality of carrier sheets from the deposition system 110 to the transfer system 130. The feed system 120 may include various components, devices, mechanisms, etc., that may be used to transfer the plurality of carrier sheets from the deposition system 110 to the transfer system 110. For example, the feed system 120 may include a tray, bin, plate, container, casket, or other receptacle for receiving the plurality of carrier sheets that may be processed by the deposition system 110. In another example, the feed system 120 may also include a belt (e.g., a conveyor belt) that may move or transport the plurality of carrier sheets from the deposition system 110 to the transfer system 130.

In one embodiment, the feed system 120 may also provide the plurality of carrier sheets from the transfer system 130 to the deposition system 110. For example, after the transfer system 130 has transferred, applied, attached, etc., one or more 2D layers from one or more carrier sheets, the feed system 120 may provide one or more carrier sheets back to the deposition system 110. This may allow the carrier sheets to be reused by the deposition system 110 to deposit, print, etc., to 2D layers. This may reduce the cost of operating the 3D printing system 100 because the 3D printing system 100 may not need to waste carrier sheets because the same set of carrier sheets may be reused by the 3D printing system 100.

In one embodiment, the feed system 120 may include a cleaning system (not illustrated in FIG. 1C) that may be used to clean the carrier sheets to remove any remaining residue after the 2D layers of the carrier sheets are transferred onto the 3D part. For example, the cleaning system may use a liquid, a gas, heat, an electrical field, a magnetic field, etc., to remove portions (e.g., particles) of the 2D layer that may remain on the carrier sheets after the 2D layer is transferred onto the 3D part. The cleaning system may include various components, devices, etc., that may be used to clean the carrier sheets. For example, the cleaning system may include jets (e.g., to spray a liquid or gas), to spray a cleaning liquid onto the carrier sheets. For example, the cleaning system may use mechanical means (e.g. brushes, squeegees, doctor blade) to remove portions of the 2D layer that may remain on the carrier sheets. In some embodiments, the cleaning system may be separate from the feed system 120. For example, the cleaning system may be located between the transfer system 130 and the feed system 120. In another example, the cleaning system may be located between the deposition system 110 and the feed system 120.

In one embodiment, the feed system 120 may provide carrier sheets from the deposition system 110 to the transfer system 130 while the deposition system 110 deposits or prints 2D layers onto other carrier sheets. For example, the feed system 120 may include a conveyor belt that loops between the deposition system 110 and the transfer system 130. The conveyor belt may provide one or more carrier sheets to the transfer system 130 while the deposition system 110 continues to deposit (e.g., print) 2D layers onto other carrier sheets.

In another embodiment, the feed system 120 may provide carrier sheets from the deposition system 110 to the transfer system 130 after the deposition system 110 deposits or prints 2D layers onto other carrier sheets. For example, the feed system 120 may include a tray, bin, etc., to collect carrier sheets after 2D layers have been printed onto the carrier sheets. After the deposition system 110 finishes depositing 2D layers onto the carrier sheets, the feed system 120 may provide the tray to the transfer system 130 so that the 2D layers on the carrier sheets may be transferred to the 3D part.

In one embodiment, the transfer system 130 may transfer a 2D layer from a carrier sheet to the 3D part to build, manufacture, construct, etc., the 3D part. The transfer system 130 may include various components, devices, etc., that may be used to transfer the 2D layer from a carrier sheet onto a 3D part. For example, the transfer system 130 may include a heated surface (e.g., a heated plate) that may be used to press or laminate the 2D layer onto the 3D part. In another example, the transfer system 130 may include a component that generates an electrical charge or electromagnetic radiation to remove the 2D layer from the surface of the carrier sheet. In a further example, the transfer system 130 may include a jet that may spray a chemical agent (e.g., a liquid) to remove the 2D layer from the surface of the carrier sheet and to transfer, layer, bond, etc., the 2D layer to the 3D part. An initial 2D layer (e.g., the very first 2D layer) of the 3D part 290 may be transferred directly onto the substrate 280. Subsequent 2D layers may be transferred onto the initial 2D layer or other 2D layers.

In one embodiment, the transfer system 130 may transfer 2D layers onto the 3D part after the 2D layers have been deposited onto the carrier sheets. For example, after the deposition system 110 has transferred the 2D layers onto the carrier sheets, the transfer system 130 may transfer 2D layers of the set of carrier sheets onto the 3D part. Thus, the deposition of the 2D layers and the transfer of the 2D layers to the 3D part may occur separately and sequentially (e.g., deposition of 2D layers first and transfer of 2D layers onto the 3D part afterwards). In another example, the deposition system 110 may continuously deposit or print the 2D layer onto the surface of the one or more carrier sheets while the transfer system 130 transfers other 2D layers from other carrier sheets, onto the 3D part (e.g., transfers the 2D layers onto the 3D part to build, construct, etc., the 3D part). Thus, the deposition of the 2D layers and the transfer of the 2D layers to the 3D part may occur both separately and simultaneously (e.g., deposition of some 2D layers occurs simultaneously with transfer of some other 2D layers onto the 3D part).

In one embodiment, the 3D printing system 100 may separate the process of producing (e.g., manufacturing, building, constructing, etc.) a 3D part into multiple phases, processes, stages, etc. For example, the 3D printing system 100 may separate the process of producing the 3D part into a deposition phase (e.g., a deposition process, a printing process) and a transfer phase (e.g., a transfer process). The deposition phase may be a phase (e.g., a process, stage, etc.) where the 2D layer is deposited or printed onto the carrier sheet. The transfer phase may be a phase where the 2D layer is transferred to the 3D part.

In some embodiments, separating the deposition phase and the transfer phase may allow the construction of the 3D part to continue even when there may be delays in one of the phases. For example, if there is a delay in the transfer phase, the deposition phase may continue to print 2D layers onto the carrier sheets. In another example, if there is a delay in the deposition phase, the transfer phase may continue with the carrier sheets that have already been provided to the transfer system 130.

In addition, because an EMR emission device or a jet (e.g., an inkjet, a print head, etc.) may be used to deposit the 2D layers, the precision and/or scale of the 3D parts may be improved. For example, thin 3D parts (e.g. 3D parts that may be tenths of micrometers thick or millimeters thick) may be constructed by applying layers of toners to the 3D part. In another example, the precision in the shape of the 3D parts may be improved because the EMR emission device (e.g., the laser) may be able to more precisely (compared to state of the art 3D printing systems) define the shape or patterns of the layers that may be used to construct the 3D part.

Figure 2:
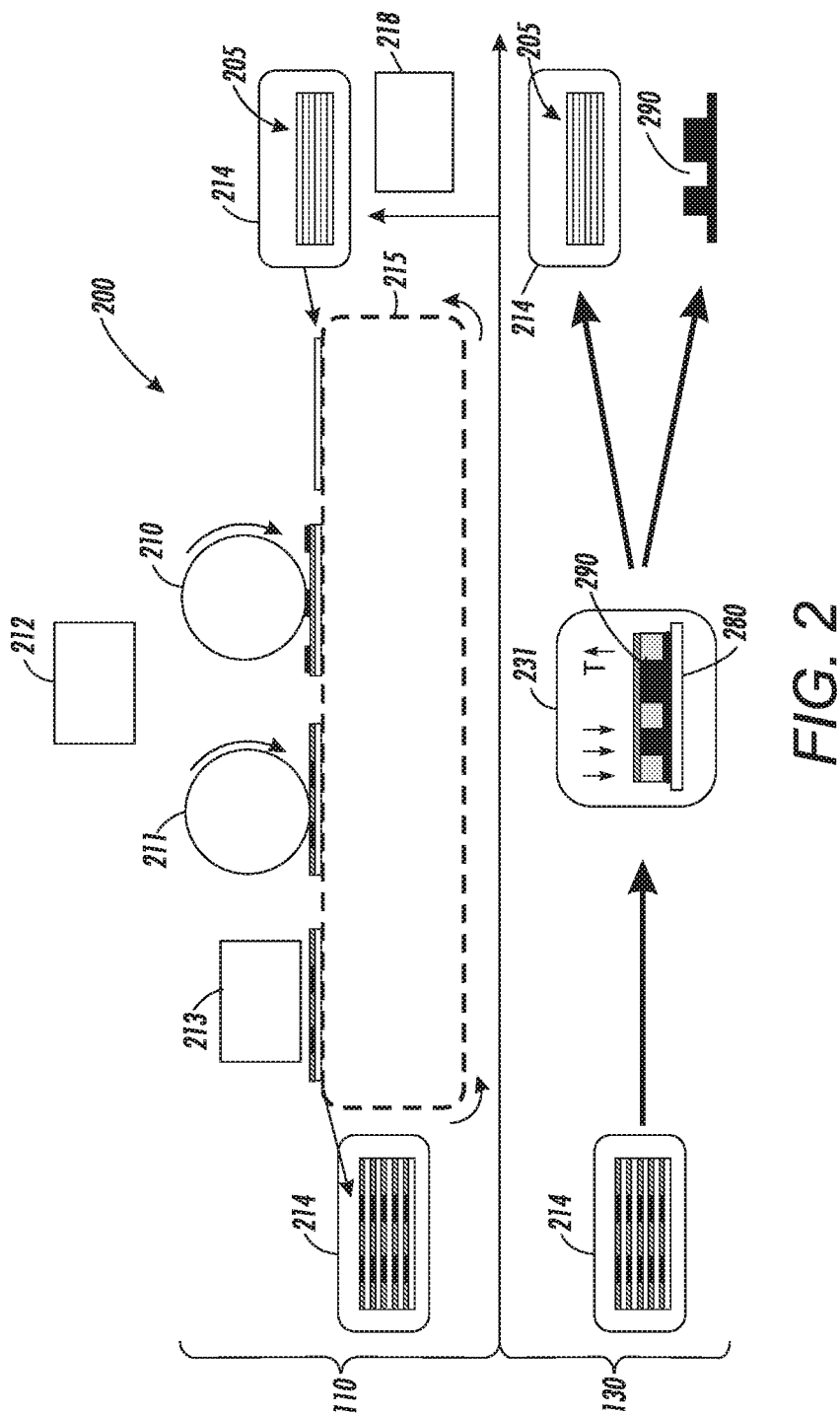
FIG. 2 is a diagram illustrating an example 3D printing system, in accordance with one or more embodiments of the present disclosure.

FIG. 2 is a diagram illustrating an example 3D printing system 200, in accordance with one or more embodiments of the present disclosure. The 3D printing system 200 includes a deposition system 110 and a transfer system 130. The deposition system 110 may deposit, print, etc., 2-dimensional (2D) layers of materials onto carrier sheets 205 (e.g., silicone sheets). The transfer system 130 may transfer the 2D layers from the carrier sheets 205 onto a 3D part 290 that may be located on a base substrate, as discussed in more detail below. The carrier sheets 205 may be deposited onto a belt 215 (e.g., a conveyor belt) from a tray 214. For example, the carrier sheets 205 may be fed or deposited one by one onto the belt 215.

As discussed above, the deposition system 110 may include one or more EMR emission devices, such as laser 212. The laser 212 may be used to change the charge on the surface of imaging drums 210 and 211. For example, the laser may generate laser light, which may be projected onto the surface of the imaging drums 210 and 211. A first roller (not illustrated in FIG. 2) may be used to apply a support material (illustrated as the light gray material on the carrier sheets 205), such as support toner particles, onto the imaging drum 210. For example, the first roller may contact the imaging drum 210 so that the support toner particles are attracted to the portions of the imaging drum 210 on which the laser light was not projected. The support material may also be referred to as sacrificial material. Support material may comprise inert powder, other materials that may be easy to wash away/dissolve/vaporize, materials that act as de-binding or anti-sintering agents, or materials that may be otherwise removed in order to release the 3D printed parts of interest. As the belt 215 (e.g., a conveyor belt) rotates counter-clockwise (as illustrated by the arrows around the belt 215), carrier sheets 205 may be rolled under the imaging drum 210 and may come into proximity and/or contact with the imaging drum 210. This may cause the support material to be electrostatically attracted or attached to the carrier sheets 205.

A second roller (not illustrated in FIG. 2) may be used to apply an active material (illustrated as the black on the carrier sheets 205) such as active toner particles, onto the imaging drum 210. For example, the first roller may contact the imaging drum 211 so that the active toner particles are attracted to the portions of the imaging drum 211 on which the laser light was not projected. The active material may be the material that forms portions of the 3D part 290. Multiple active material deposition systems may be deployed to from 3D printed parts that are composed of multiple materials (e.g., a composite of materials). As the belt 215 (e.g., a conveyor belt) rotates counter-clockwise (as illustrated by the arrows around the belt 215), carrier sheets 205 may be rolled under the imaging drum 211 and may come into proximity to and/or contact with the imaging drum 211. This may cause the active material to be electrostatically attracted to the carrier sheets 205. In one embodiment, the deposition system 110 may deposit, print, etc., the 2D layer onto the carrier sheet at a particular location and/or orientation, as discussed in more detail below. For example, the deposition system 110 may align the 2D layer with one or more of an alignment feature, an edge of the carrier sheet 205, a corner of the carrier sheet 205, etc.

In some embodiments, the active material may be a different material than the support material. For example, the active material may include metallic toner particles and the support material may include polymer or plastic (e.g., toner) particles. In another example, the active material may include a first type of polymer or plastic (e.g., toner) particles and the support material may include a second type of polymer or plastic (e.g., toner) particles with a lower melting point.

After the active material and the support material (e.g., active toner particle and support toner particles) are applied to a carrier sheet 205, a treatment element 213 may fuse, cure, bond, heat, etc., the active material and the support material. For example, the treatment element 213 may be a heated roller that is in contact with the active material and the support material. In one embodiment, the active material and the support material may form a 2D layer that may be transferred to the 3D part 290 by the transfer system 130.

In one embodiment, the active material may define a first pattern that may correspond to a cross-section of the 3D part. For example, the active material may define a pattern that may include various shapes (e.g., geometric shapes, irregular shapes, etc.) that may be located in different regions of the carrier sheet. These shapes may correspond to different cross-sections of the 3D part 290 at a particular height.

As illustrated in FIG. 2, the carrier sheet with the 2D layers of active and support material may be collected in a tray 214. The tray 214 may be provided to the transfer system 130. For example, a feed system (not illustrated in FIG. 2) may feed the tray 214 to the transfer system 130 so that the transfer system 130 may transfer, laminate, add, etc., the 2D layers on each carrier sheet 205 (e.g., the active and support material on each carrier sheet 205) onto the 3D part 290.

In one embodiment, the transfer system 130 may transfer a 2D layer from a carrier sheet 205 to the 3D part 290 to build, manufacture, construct, etc., the 3D part 290. For example, the transfer system 130 may build up the 3D part 290 layer by layer using the 2D layers from the carrier sheets 205. The transfer system 130 may include a transfer element 231. The transfer element 231 may include various components, devices, etc., that may be used to transfer the 2D layer from a carrier sheet 205 onto a 3D part 290. One example of a transfer element 231 may be a heat source (e.g., a heated surface or plate) that may press or laminate the 2D layer from a carrier sheet 205 onto the 3D part 290. The transfer element 231 may be any component, device, etc., that may be used to remove the 2D layer from the carrier sheet 205 and attach, bind, laminate, transfer, etc., the 2D layer to the 3D part 290. The 3D part 290 may be located on a base substrate 280 (e.g., a base).

In one embodiment, transfer element 231 may transfer the 2D layers to the 3D part 290 sequentially. For example, the transfer element 231 may transfer the 2D layer from a first carrier sheet 205 of the group of carrier sheets onto the 3D part 290. After the first carrier sheet 205, the transfer element 230 may transfer the 2D layer from the second carrier sheet 205 of the group of carrier sheets onto the 3D part 290.

After the transfer element 231 transfers the 2D layers form the carrier sheets 205 to the 3D part 290, the tray 214 may be used to hold the carrier sheets 205 (e.g., the empty carrier sheets 205). The tray 214 may be provided to the deposition system 110 (e.g., to the belt 215) so that the empty carrier sheets may be cleaned and reused to deposit (e.g., print) additional 2D layers. For example, the cleaning system 218 may clean the empty carrier sheets 205. The cleaning system 218 may include devices, components, materials, etc., that may be used to clean the carrier sheets 205. For example, the cleaning system 218 may include a cleaning liquid and a jet to spray the cleaning liquid onto the carrier sheets 205. In another example, the cleaning system 218 may also include a heated element that may be used to dry the carrier sheets 205. In a further example, the cleaning system 218 may use mechanical means (e.g. brushes, squeegees, doctor blade, mechanical vibration, etc.) to remove portions of the 2D layer that may remain on the carrier sheets. In addition, after the transfer element 231 transfers the 2D layers form the carrier sheets 205 to the 3D part 290, the sacrificial material (illustrated by the light grey material around the 3D part 290) surrounding the 3D part may be removed to expose the 3D part 290.

In one embodiment, the transfer system 130 may transfer 2D layers onto the 3D part after the 2D layers have been deposited onto the carrier sheets. For example, after the deposition system 110 has transferred the 2D layers onto the carrier sheets, the transfer system 130 may transfer 2D layers of the set of carrier sheets onto the 3D part. Thus, the deposition of the 2D layers and the transfer of the 2D layers to the 3D part may occur separately and sequentially (e.g., deposition of 2D layers first and transfer of 2D layers onto the 3D part afterwards). In another example, the deposition system 110 may continuously deposit or print the 2D layer onto the surface of the one or more carrier sheets while the transfer system 130 transfers other 2D layers from other carrier sheets, onto the 3D part (e.g., transfers the 2D layers onto the 3D part to build, construct, etc., the 3D part). Thus, the deposition of the 2D layers onto the carrier sheets and the transfer of the 2D layers to the 3D part may occur separately and simultaneously (e.g., deposition of some 2D layers occurs simultaneously with transfer second of other 2D layers onto the 3D part.).

In one embodiment, the deposition system 110 may include multiple imaging drums that may be used to deposit different types of active materials onto the carrier sheets 205. For example, a second imaging drum (not illustrated in FIG. 2) may be located between the imaging drum 211 and the treatment element 213. The second imaging drum may be used to deposit a second type of active material onto the carrier sheets 205. This may allow the deposition system 110 to deposit a set of materials (e.g., a combination of different materials, a composite of materials, etc.) onto the carrier sheets 205. This may also allow the 3D printing system 200 to produce, construct, build, etc., 3D parts that include different materials (e.g., composite 3D parts).

As illustrated in FIG. 2, the belt 215 moves in a single direction (e.g., a counter clockwise direction). The 3D printing system 200 may move the belt 215 in the same direction without changing the direction during the deposition phase (e.g., deposition process) and the transfer phase (e.g., the transfer process). This may reduce the back and forth motion that may be present in other types of 3D printing systems. This may help increase the precision when transferring the 2D layers to the 3D part 290. For example, because the belt 215 moves in a single direction at a constant speed, it may help 3D printing system 200 to align the 2D layers with the 3D part 290. In addition, the belt 215 may move at a constant speed (e.g., the whole belt 215 moves at the same, constant speed). This may allow the 3D part 290 to be built more quickly because portions of the belt 215 are not slowed down to allow the 2D layers to be transferred to the 3D part 290. In addition, the carrier sheets 205 may be light or light weight. This allows the belt 215 to move the carrier sheets 205 more easily through the 3D printing system 200 rather than moving a platen (e.g., a metal plate) to transfer 2D layers onto the 3D part 290) and if needed, the (light weight) carrier sheets themselves may be locally accelerated/decelerated separately from the belt as needed, without having to speed up/slow down the entire (heavier) belt assembly.

Figure 3:
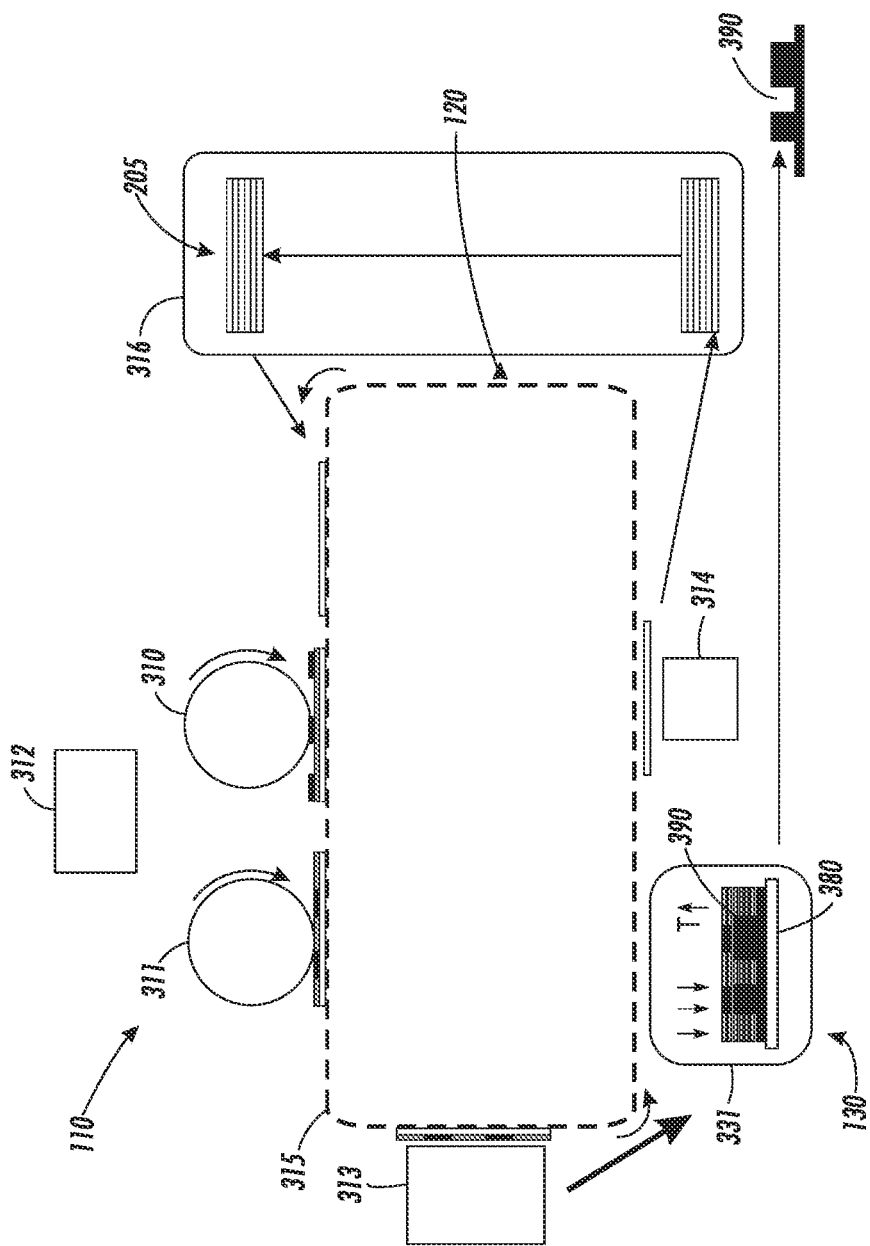
FIG. 3 is a diagram illustrating an example 3D printing system, in accordance with one or more embodiments of the present disclosure.

FIG. 3 is a diagram illustrating an example 3D printing system 300, in accordance with one or more embodiments of the present disclosure. The 3D printing system 300 includes a deposition system 110 and a transfer system 130. The deposition system 110 may deposit, print, etc., 2-dimensional (2D) layers of materials onto carrier sheets 205 (e.g., silicone sheets). The transfer system 130 may transfer the 2D layers from the carrier sheets 205 onto a 3D part 290 that may be located on a base substrate, as discussed in more detail below. The feed system 120 may move the carrier sheets 205 between the deposition system 110 and the transfer system 130. The feed system 120 includes a belt 315 (e.g., a conveyor belt) and a tray mechanism 316. The carrier sheets 205 may be deposited by the tray mechanism 316 onto the belt 315 (e.g., a conveyor belt). For example, the carrier sheets 205 may be fed or deposited one by one, onto the belt 315 by the tray mechanism 316.

As discussed above, the deposition system 110 may include one or more EMR emission devices, such as laser 312. The laser 312 may be used to change the charge on the surface of imaging drums 310 and 311. A first roller (not illustrated in FIG. 3) may be used to apply a support material (illustrated as the light gray material on the carrier sheets 205), such as support toner particles, onto the imaging drum 310. The support material may also be referred to as sacrificial material. As the belt 315 (e.g., a conveyor belt) rotates counter-clockwise (as illustrated by the arrows around the belt 315), carrier sheets 205 may be rolled under the imaging drum 310 and may come into proximity to and/or contact with the imaging drum 310. This may cause the support material to be electrostatically attracted to the carrier sheets 205.

A second roller (not illustrated in FIG. 3) may be used to apply an active material (illustrated as the black on the carrier sheets 205) such as active toner particles, onto the imaging drum 310. The active material may be the material that forms portions of the 3D part 390. As the belt 315 (e.g., a conveyor belt) rotates counter-clockwise (as illustrated by the arrows around the belt 315), carrier sheets 205 may be rolled under the imaging drum 311 and may come into proximity to and/or contact with the imaging drum 311. This may cause the active material to be electrostatically attracted to the carrier sheets 205. In one embodiment, the deposition system 110 may deposit, print, etc., the 2D layer onto the carrier sheet at a particular location and/or orientation, as discussed in more detail below. For example, the deposition system 110 may align the 2D layer with an alignment feature, an edge of the carrier sheet 205, a corner of the carrier sheet 205, pre-defined features (e.g. printed, embossed, lithographically-defined, etc.) on the carrier sheet 205, etc. In some embodiments, the active material may be a different material than the support material, as discussed above.

After the active material and the support material (e.g., active toner particle and support toner particles) are applied to a carrier sheet 205, a treatment element 313 may fuse, cure, bond, heat, etc., the active material and the support material. In one embodiment, the active material and the support material may form a 2D layer that may be transferred to the 3D part 390 by the transfer system 130. The active material may define a first pattern that may correspond to a cross-section of the 3D part, as discussed above.

As illustrated in FIG. 3, the carrier sheets 205 with the 2D layers of active and support material may be provided by the belt 315 (of the feed system 120) to the transfer system 120. In one embodiment, the transfer system 130 may transfer a 2D layer from a carrier sheet 205 to the 3D part 390 to build, manufacture, construct, etc., the 3D part 390. For example, the transfer system 130 may build up the 3D part 390 layer by layer using the 2D layers from the carrier sheets 205. The transfer system 130 may include a transfer element 331. The transfer element may include various components, devices, etc., that may be used to transfer the 2D layer from a carrier sheet 205 onto a 3D part 390. One example of a transfer element 331 may be a heat source (e.g., a heated surface or plate) that may press or laminate the 2D layer from a carrier sheet 205 onto the 3D part 390. The transfer element 331 may be any component, device, etc., that may be used to remove the 2D layer from the carrier sheet 205 and attach, bind, laminate, transfer, etc., the 2D layer to the 3D part 390. The 3D part 390 may be located on a base substrate 380 (e.g., a base).

An initial 2D layer (e.g., the very first 2D layer) of the 3D part 390 may be transferred directly onto the substrate 380. Subsequent 2D layers may be transferred onto the initial 2D layer or other 2D layers.

In one embodiment, transfer element 331 may transfer the 2D layers to the 3D part 390 sequentially. For example, the transfer element 331 may transfer the 2D layer from each carrier sheet 205 as the carrier sheet 205 passes through or by the transfer element 331.

After the transfer element 331 transfers the 2D layer from a carrier sheet 205 to the 3D part 390, the belt 315 may carry the carrier sheet to the cleaning system 314. The cleaning system 314 may include devices, components, materials, etc., that may be used to clean the carrier sheets 205. For example, the cleaning system 314 may include a cleaning liquid and a jet to spray the cleaning liquid onto the carrier sheets 205. In another example, the cleaning system 313 may also include a heated element that may be used to dry the carrier sheets 205. For example, the cleaning system may use mechanical means (e.g. brushes, squeegees, doctor blade) to remove portions of the 2D layer that may remain on the carrier sheets. The cleaned carrier sheets 205 (e.g., the cleaned and blank/empty carrier sheets 205) may be provided to the tray mechanism 316 via the belt 315. The tray mechanism 316 may then provide the cleaned, blank, empty, etc., carrier sheets 205 to the a portion (e.g., the front portion) of the belt 315 where the belt 315 may provide the carrier sheets 205 to the imaging drums 310 and 311.

In one embodiment, the deposition system 110 may continuously deposit or print the 2D layer onto the surface of the one or more carrier sheets while the transfer system 130 transfers other 2D layers from other carrier sheets, onto the 3D part (e.g., transfers the 2D layers onto the 3D part to build, construct, etc., the 3D part). Thus, the deposition of the 2D layers onto the carrier sheets and the transfer of the 2D layers to the 3D part may occur both separately and simultaneously (e.g., deposition of some 2D layers occurs simultaneously with the transfer of other 2D layers onto the 3D part.). For example, the belt 315 (of the feed system 120) provides some carrier sheets to the deposition system 110 and provides other carrier sheets 205 to the transfer system 130 simultaneously.

As illustrated in FIG. 2, the belt 315 moves in a single direction (e.g., a counter clockwise direction). The 3D printing system 300 may move the belt 315 in the same direction without changing the direction during the deposition phase (e.g., deposition process) and the transfer phase (e.g., the transfer process). This may reduce the back and forth motion that may be present in other types of 3D printing systems. This may help increase the precision when transferring the 2D layers to the 3D part 390. For example, because the belt 315 moves in a single direction at a constant speed, it may help 3D printing system 300 to align the 2D layers with the 3D part 390. In addition, the belt 315 may move at a constant speed (e.g., the whole belt 315 moves at the same, constant speed). This may allow the 3D part 390 to be built more quickly because portions of the belt 315 are not slowed down to allow the 2D layers to be transferred to the 3D part 390. In addition, the carrier sheets 205 may be light or light weight. This allows the belt 215 to move the carrier sheets 205 more easily through the 3D printing system 300 rather than moving a platen (e.g., a metal plate) to transfer 2D layers onto the 3D part 290).

Figure 4A:
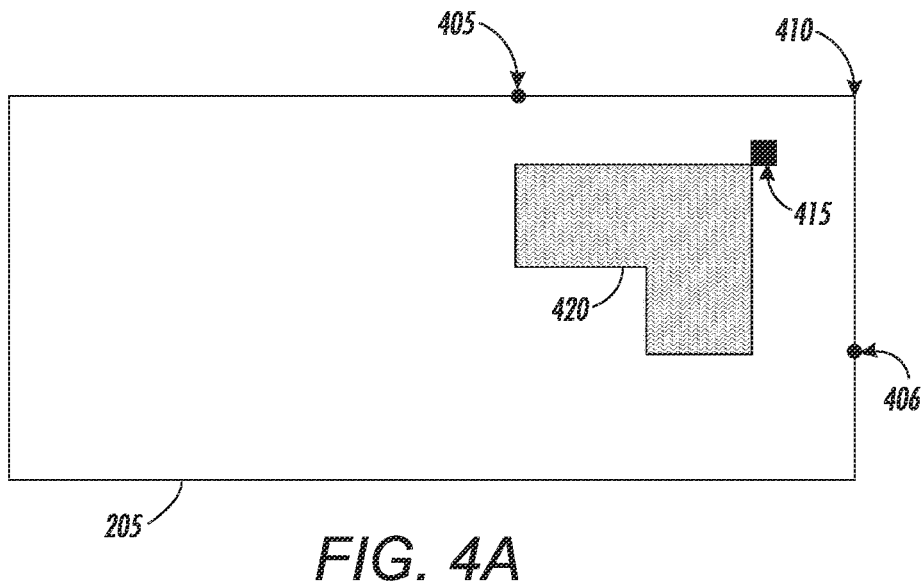
FIG. 4A is a diagram illustrating an example carrier sheet, in accordance with one or more embodiments of the present disclosure.

FIG. 4A is a diagram illustrating an example carrier sheet 205, in accordance with one or more embodiments of the present disclosure. As discussed above, the carrier sheet 205 may be provided to a deposition system (e.g., deposition system 110 illustrated in FIGS. 1C-3). The deposition system may deposit a 2D layer 420 (e.g., a layer of toner particles, a layer of ink, etc.) to the surface of the carrier sheet 205. A 2-dimensional (2D) layer in the context of the current disclosure is defined as a layer 420 of an "active material" of thickness less than 1000 micrometers, comprising a 2-dimensional (2D) pattern defined by or within the layer, with said layer being uniform in the 3rd (e.g., vertical or into the plane of FIG. 4A) dimension. The 2D layer may additionally include a support material that is patterned within the 2D layer (e.g., to fill in some or all or any voids left by the patterned active material in said 2D layer, such that a contiguous composite 2D layer may be formed comprising the active and support materials, and successive 2D layers may be reliably transferred on top of said composite 2D layer.

As discussed above, the 2D layer 420 may be positioned, aligned, etc., on the carrier sheet 205. In one embodiment, the 2D layer 420 may be aligned (or positioned) using an alignment feature 415. The alignment feature 415 may be a marking, a shape, a texture, a material (e.g., toner particles), a device, a sensor, an aperture (e.g., a hole, an opening, etc.) that may be used as a reference point, a reference line to deposit the 2D layer 420 onto the carrier sheet 205. For example, the deposition system may position the upper right corner of the 2D layer such that it is in contact with the lower left corner of the alignment feature 415.

In some embodiments, the alignment feature 415 may be a sensor (e.g., an active sensor that transmits electromagnetic waves/signals, acoustic waves/signals, etc.). The sensor (e.g., alignment feature 415) may be positioned relative to other sensors on the base substrate in a closed-loop fashion. For example, the deposition system 110 may adjust, reposition, move, etc., the carrier sheet 205 left, right, up, down, etc., until the deposition system 110 detects that the alignment feature 415 (e.g., a sensor) is aligned with the base substrate. The deposition system 110 may include various sensors, detectors, camera, etc., to determine whether the alignment feature 415 is properly aligned. For example, the deposition system 110 may include a camera that may be used to detect or determine whether the alignment feature 415 is in the correct position relative to the base substrate. In another example, the deposition system 110 may include a magnetic sensor to determine whether a magnet (e.g., an alignment feature 415) is in the correct position relative to the base substrate. In another embodiment, the alignment feature 415 may be a mechanical feature or component (e.g., a tab, a protrusion, an opening, a latch, etc.) that may interface with a mechanical feature of the base substrate. For example, the alignment feature may be a tab or protrusion that aligns with a hole or opening on the base substrate.

In one embodiment, the base substrate may also include alignment features that may align relative to alignment feature 415 on carrier sheet 205. For example, the base substrate may include a sensor that may detect another sensor (e.g., alignment feature 415) on the carrier sheet 205. In another example, the base substrate may include a magnetic sensor that may detect a magnet (e.g., an alignment feature 415) that is on the carrier sheet 205.

In another embodiment, the 2D layer 420 may be aligned (or positioned) using the edges of the carrier sheet. For example, a first position 405 along the top edge and a second position 406 along the right edge may be used as reference points to deposit the 2D layer 420 onto the carrier sheet 205 such that the left edge of the 2D layer 420 is located along a vertical line that goes through the first position 405 and the bottom edge of the 2D layer 420 along a horizontal line that goes through at the second position 406.

In a further embodiment, the 2D layer 420 may be aligned (or positioned) using the corner 410 of the carrier sheet 205. For example, the 2D layer 420 may be located at a certain distance and direction away from the corner 410.

Figure 4B:
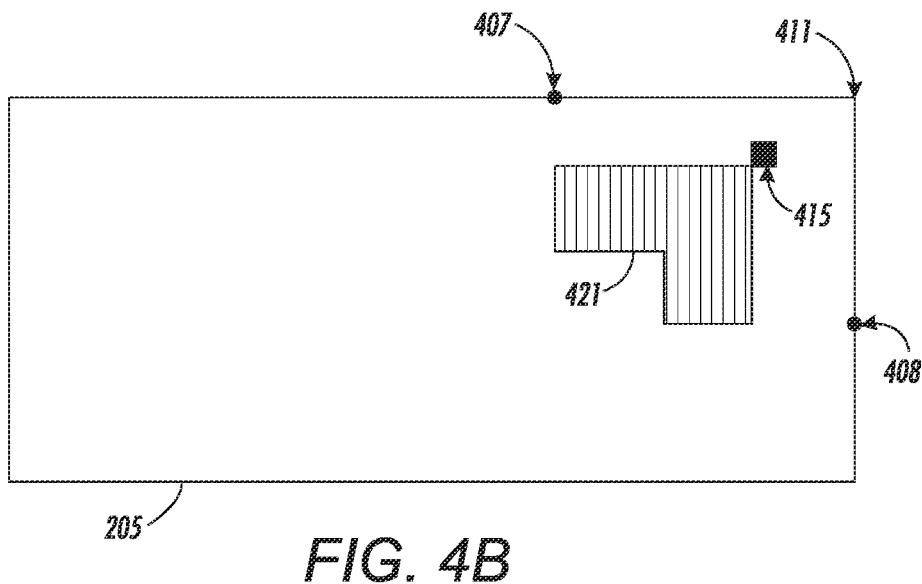
FIG. 4B is a diagram illustrating an example carrier sheet, in accordance with one or more embodiments of the present disclosure.

FIG. 4B is a diagram illustrating an example carrier sheet, in accordance with one or more embodiments of the present disclosure. As discussed above, the carrier sheet 205 may be provided to a deposition system (e.g., deposition system 110 illustrated in FIGS. 1C-3). The deposition system may deposit a 2D layer 421 (e.g., a layer of toner particles, a layer of ink, etc.) to the surface of the carrier sheet 205.

As discussed above, the 2D layer 421 may be positioned, aligned, etc., on the carrier sheet 205. In one embodiment, the 2D layer 421 may be aligned (or positioned) using an alignment feature 415, as discussed above. In another embodiment, the 2D layer 421 may be aligned (or positioned) using the edges of the carrier sheet. For example, the 2D layer 421 may be aligned (or positioned) using the locations 407 and 408. In a further embodiment, the 2D layer 421 may be aligned (or positioned) using the corner 411 of the carrier sheet 205.

Figure 4C:
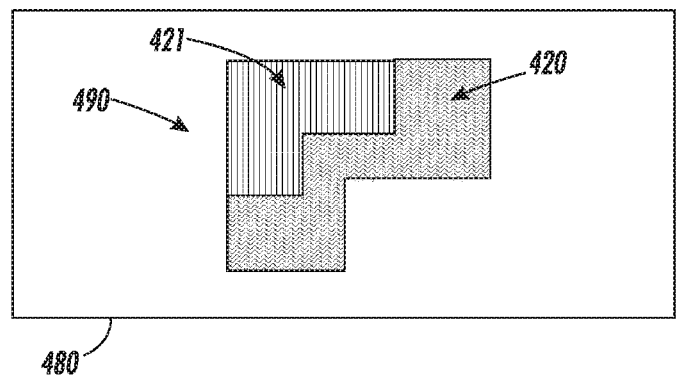
FIG. 4C is a diagram illustrating a 3D part, in accordance with one or more embodiments of the present disclosure.

FIG. 4C is a diagram illustrating a 3D part 490, in accordance with one or more embodiments of the present disclosure. The 3D part 490 is located on a base substrate (e.g., a base plate, a base, a final substrate, etc.). As discussed above, the 3D part 490 may be constructed, built, etc., by transfer 2D layers onto the 3D part 490. As discussed above, a transfer system (e.g., transfer system 130 illustrated in FIGS. 1C-3) may transfer (e.g., may layer, laminate, apply, etc.) the 2D layers onto the 3D part 490.

As illustrated in FIG. 4C, the 2D layer 420 may be located on the base substrate 480. The 2D layer 421 may be transferred onto the 3D part 490 on top of the layer 420. This allows a 3D printing system to build, construct, etc., the 3D part 490 layer by layer. In addition, the 2D layers 420 and 421 may be flipped or reversed along a vertical axis (may be mirror images of a cross section of the 3D part 490) because the carrier sheets 205 illustrated in FIGS. 4A and 4B may be flipped over to transfer the 3D part 490 onto the 3D part 490.

Figure 5:
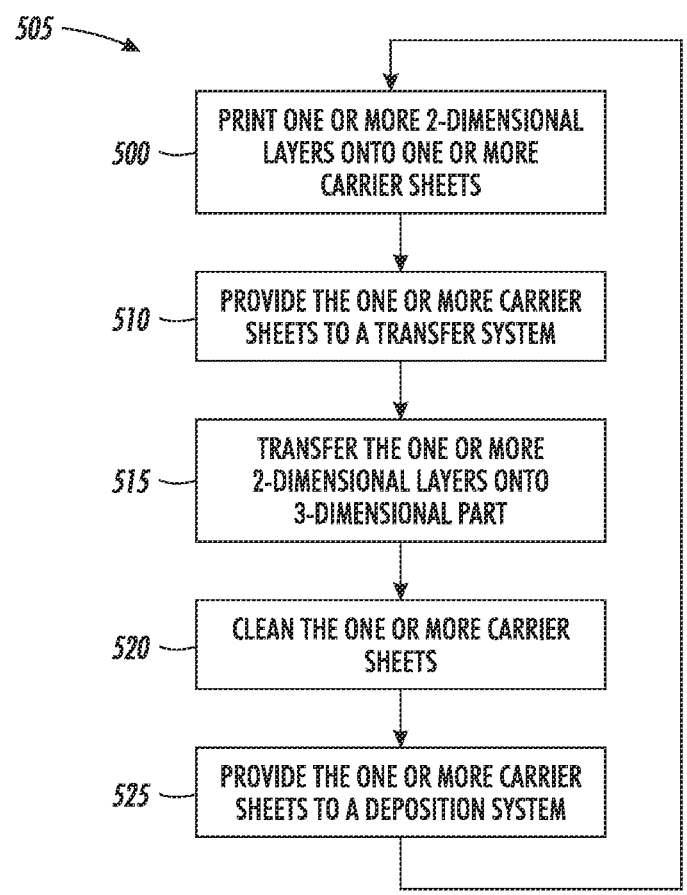
FIG. 5 is a flow diagram of an embodiment of a method of providing high-speed 3D printing, in accordance with the present embodiments.

FIG. 5 illustrates a flow diagram of a method 500 for constructing a 3D part, in accordance with some embodiments of the present disclosure. Method 500 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions run/executed on a processing device), firmware (e.g., microcode), or a combination thereof. In some embodiments, the method 500 may be performed by one or more of a computing device (e.g., a server computer, a desktop computer, a smart phone, a tablet computer, etc.), a deposition system, a feed system, and a transfer system.

The method 500 starts at block 505 where method 500 prints (e.g., deposits) one or more 2D layers onto one or more carrier sheets. For example, a deposition system may print 2D layers onto one or more carrier sheets, as discussed above. At block 510, the method 500 may provide the one or more carrier sheets (with the one or more 2D layers) to a transfer system. The one or more carrier sheets may be provided to the transfer system via a feed system, as discussed above. At block 515, the method 500 may transfer the one or more 2D layers onto a 3D part. For example, the transfer system may transfer the one or more 2D layers onto the 3D part using heat. At block 520, the method 500 may optionally clean the one or more carrier sheets. For example, the method 500 may use a jet and a cleaning liquid to clean the one or more carrier sheets. At block 525, the one or more carrier sheets (e.g., the cleaned and/or empty/blank carrier sheets) may be provided back to the deposition system. In some embodiments, the blocks 505 through 525 may be repeated in a loop. In other embodiments, some of the blocks may be performed simultaneously. For example, 2D layers may be deposited onto a first set of carrier sheets while 2D layers of a second set of carrier sheets are transferred to the 3D part.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof. Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

In the context of the current disclosure, the term "active material" or "active material to be 3D printed" is defined as any material that is to be patterned into a 3-dimensional (3D)

shape or form, in order to form a 3D printed part and the term "support material" or "supporting material" is defined as any material (e.g., sacrificial material) that serves as a temporary support (e.g., mechanical support) for the active material being 3D printed, during the 3D printing process.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A system for producing a 3-dimensional (3D) part, the system comprising:
   a deposition system configured to print a plurality of 2-dimensional (2D) layers onto a plurality of carrier sheets, wherein the plurality of carrier sheets are spaced apart from one another and move through the deposition in a direction on a conveyor belt;
   a transfer system configured to transfer at least one 2D layer from the plurality of carrier sheets, onto the 3D part, wherein the 3D part is located on a base substrate; and
   a feed system configured to:
      provide the plurality of carrier sheets from the deposition system to the transfer system; and
      after the transfer of the at least one 2D layer from the plurality of carrier sheets, collect the carrier sheets in a tray and feed the carrier sheets from the tray to the conveyor belt to return to the deposition system.

2. The system of claim 1, wherein a first 2D layer of the plurality of 2D layers defines a first pattern corresponding to a cross-section of the 3D part.

3. The system of clam 15, wherein the first 2D layer further comprises a second pattern that does not correspond to the cross-section of the 3D printed part.

4. The system of claim 3, wherein the first pattern comprises a first set of materials and the second pattern comprises a second material.

5. The system of claim 4, wherein the first set of materials comprises a set of active materials and the second material comprises a support material.

6. The system of claim 1, wherein the deposition system comprises an electromagnetic radiation emission device.

7. The system of claim 6, wherein the electromagnetic emission device is configured to apply toner particles to the plurality of carrier sheets.

8. The system of claim 7, wherein the toner particles comprise at least one of: a polymer, a metal, or a ceramic.

9. The system of claim 1, further comprising a jetting print head configured to apply material to the plurality of carrier sheets.

10. The system of claim 9, wherein the material comprises at least one of: a polymer, a dielectric, a metal, or a ceramic.

11. The system of claim 1, wherein:
   the deposition system is further configured to successively print the plurality of 2D layers onto the plurality of carrier sheets without changing the direction of the plurality of carrier sheets during a deposition process; and
   the transfer system is configured to successively print the plurality of 2D layers onto the 3D part without changing the direction of the plurality of carrier sheets during a transfer process; and
   the feed system is configured to maintain the directionality of motion of the carrier sheets in the deposition and transfer systems and produce the 3D part without reversing the print and transfer processing directions for the successive 2D layers.

12. The system of claim 1, wherein the deposition system is further configured to align the 2D layers using at least one of:
   a set of alignment features on the plurality of carrier sheets; a set of edges of the plurality of carrier sheets; and
   a set of corners of the plurality of carrier sheets.

13. The system of claim 1, wherein the plurality of 2D layers are successively printed onto the plurality of carrier sheets while the transfer system transfers at least one 2D layer onto the 3D part.

14. The system of claim 1, wherein the transfer system transfers at least one 2D layer onto the 3D part after the plurality of 2D layers are successively printed onto the plurality of carrier sheets.

15. The system of claim 1, wherein a first 2D layer of the plurality of 2D layers is transferred onto the 3D part using at least one of: heat, pressure, electromagnetic radiation, or a chemical agent.

16. The system of claim 1, wherein all portions of the conveyor belt are driven at a uniform speed in the direction and a directionality of motion of the conveyer belt is maintained during the production of the 3D part.

17. The system of claim 1, wherein the feed system is configured to clean the plurality of the carrier sheets before the plurality of carrier sheets are provided to the depositing system.

* * * * *